United States Patent [19]
Ouchi et al.

[11] Patent Number: 5,407,213
[45] Date of Patent: Apr. 18, 1995

[54] PACK SEAL HAVING PASSIVE PULSER RING

[75] Inventors: Hideo Ouchi, Sagamihara; Youji Nakano, Okayama; Hiroya Miyazaki, Fujisawa; Shuichi Ishikawa, Kanagawa, all of Japan

[73] Assignees: NSK. Ltd.; Uchiyama Kogyo Kabushiki Kaisha, both of Japan

[21] Appl. No.: 91,354

[22] Filed: Jul. 15, 1993

Related U.S. Application Data

[62] Division of Ser. No. 943,310, Sep. 11, 1992, Pat. No. 5,261,752.

[30] Foreign Application Priority Data

Sep. 12, 1991 [JP] Japan ................. 3-096860
Sep. 19, 1991 [JP] Japan ................. 3-083729

[51] Int. Cl.$^6$ ............................ F16J 15/32
[52] U.S. Cl. ........................ 277/2; 277/39; 277/152; 324/207.22; 324/207.25
[58] Field of Search ............ 277/2, 35, 38, 39, 152; 384/448; 324/173, 174, 207.22, 207.25

[56] References Cited

U.S. PATENT DOCUMENTS

| | | | |
|---|---|---|---|
| 3,021,161 | 2/1962 | Rhoads et al. | 277/39 |
| 3,086,781 | 4/1963 | Hudson et al. | 277/39 |
| 4,161,120 | 7/1979 | Cloarec | 73/494 |
| 4,516,783 | 5/1985 | Mitsue et al. | 277/152 X |
| 4,688,951 | 8/1987 | Guers | 384/446 |
| 4,850,722 | 7/1989 | Bayer | 384/448 |
| 4,856,794 | 8/1989 | Boyers et al. | 277/152 X |
| 4,948,277 | 8/1990 | Alff | 384/448 |
| 5,002,287 | 3/1991 | Eskillson | 277/2 |
| 5,042,822 | 8/1991 | Dreschmann et al. | 277/152 X |
| 5,129,744 | 7/1992 | Otto et al. | 277/152 X |
| 5,166,611 | 11/1992 | Kujawa, Jr. et al. | 384/448 X |
| 5,183,269 | 2/1993 | Black et al. | 277/152 X |

FOREIGN PATENT DOCUMENTS

| | | | |
|---|---|---|---|
| 0485522 | 8/1952 | Canada | 277/35 |
| 375019 | 6/1990 | European Pat. Off. . | |
| 378939 | 7/1990 | European Pat. Off. . | |
| 2558223 | 7/1985 | France . | |
| 2574501 | 6/1986 | France . | |
| 1211239 | 10/1989 | Italy . | |
| 60-112757 | 7/1985 | Japan . | |
| 62-242130 | 10/1987 | Japan . | |
| 64-21219 | 1/1989 | Japan . | |
| 1550178 | 8/1979 | United Kingdom . | |
| 1604861 | 12/1981 | United Kingdom . | |

Primary Examiner—William A. Cuchlinski, Jr.
Assistant Examiner—John L. Beres
Attorney, Agent, or Firm—Evenson, McKeown, Edwards & Lenahan

[57] ABSTRACT

A pack seal apparatus formed with a first rigid ring having a radial leg portion and an axial leg portion in an L-shaped cross section, a second rigid ring having a radial leg portion and an axial leg portion in an L-shaped cross section, the first and second rings being coaxially arranged to be rotatable with respect to each other, a first elastic annular seal member secured to the radial leg portion of the first ring so as to be sealingly and slidingly engaged with the axial leg portion of the second ring, a second elastic annular seal member secured to the radial leg portion of the second ring so as to be sealingly and slidingly engaged with the axial leg portion of the first ring; the axial and radial leg portions of the first ring, the axial and radial leg portions of the second ring, and the first and second elastic annular seal members cooperating to define a closed annular space, and a pulser ring made of a separate thin metal plate mounted on the radial leg portion of one of the first and second rings and having a peripheral portion formed with a plurality of cutouts therethrough, in which the plurality of cutouts are arranged in a circumferential direction to be sensed as the pulser ring rotates.

4 Claims, 9 Drawing Sheets

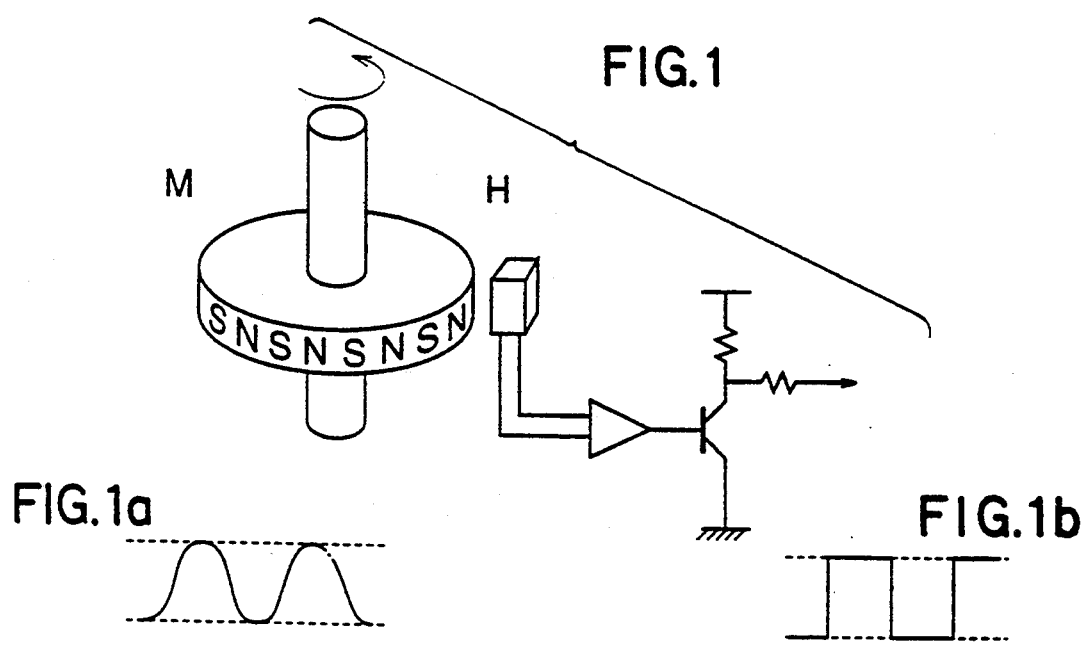
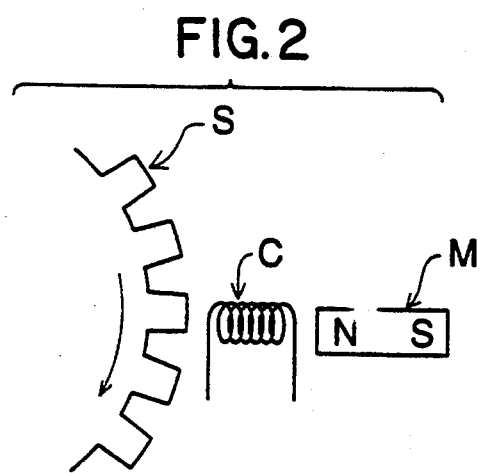

PACK SEAL HAVING PASSIVE PULSER RING

This is a division of application Ser. No. 07/943,310, filed Sep. 11, 1992, now U.S. Pat. No. 5,261,752.

BACK GROUND OF THE INVENTION

Conventionally the active pulser ring system and the passive pulser ring system are adopted to detect rotating speeds of wheels.

FIG. 1 shows one example of the active pulser ring system which has a magnet pulser ring M with alternative N and S poles and a magnetic sensor H having e.g. Hall elements to generate wave forms a) and b). The rotations of the pulser ring are detected by the magnetic sensor H through changes of the poles. This system is characterized by the pulser ring which generates magnetic forces.

FIG. 2 shows an example of the passive pulser ring system which has a rotating pulser ring S with alternative strong and weak magnetic resistances and an outside magnet means M. The magnetic forces from outside is detected by a magnetic sensor C through the alternative strong and weak magnetic resistances to measure rotational speed of the pulser ring S. This system is characterized by the pulser ring which receives the magnetic forces from outside, which is disclosed e.g. in Japanese Utility Model First Publication No. 60-112757, U.S. Pat. Nos. 4,161,120 and 5,002,287.

Compact systems to detect rotations of the bearing are developed to have a pulser ring installed between the outer and inner rings of the bearing as disclosed in U.S. Pat. No. 4,688,951, European Patent Publication No. 0,375,019 and United Kingdom Patent Publication No. 1,640,861.

The pulser ring is integrally incorporated in the seal structure radially between the inner and outer rings of the bearing to make compact the whole rotation detecting device.

Active pulser rings integrally provided within a seal means between the outer and inner rings of the bearing are disclosed in European Publication NO. 0,378,939, French Patent Publication No. 2574501, Japanese First Patent Publication No. 62-242130.

However, it is still required to prevent the installed magnet from being adversely affected by an outside magnetic field when the bearing is assembled with the installed magnet, and for improving the mechanical strength of the magnet so as not to damage the magnet upon assembling the bearing.

For example, ferrite magnetic plates with relatively lower mechanical strength as shown in European Patent Publication No. 0375019, and in Japanese Patent Publication No. 62-242130 must be cared on cracks and deformation etc. upon press-fitting into a seal groove in the outer ring. Generally, such magnetic plates are bonded to a steel plate frame as disclosed in French Patent Publication No. 2,574,501.

It is still, however, required to prevent the magnet from being adversely affected by the outside magnetic field even in the case where the magnet is bonded to the steel plate frame.

On the other hand, the passive pulser ring integrally provided within a seal structure between the outer and inner rings of the bearing is disclosed in U.S. Pat. No. 4,850,722, Japanese Patent publication No. 62-242130 and Japanese Patent Publication No. 64-21219.

In this type of bearings having such a passive pulser ring, appreciable differences of the magnetic resistances and precise measuring gaps with reference to the magnetic sensor are required.

Japanese Utility Model First Publication No. 60-112757 discloses a bearing structure where a passive pulser ring is mounted onto a seal frame, not onto the outer peripheral surface of the housing, with notches provided along its periphery and radially projecting therefrom so as to detect magnetic resistances in the axial direction of the housing. This type of bearing structure is difficult to be made compact because of axially extending teeth-section.

SUMMARY OF THE INVENTION

An object of the present invention is to provide a passive pulser ring integrally provided with a seal structure radially between the inner and outer rings of a bearing to positively achieve appreciable differences in magnetic resistance, a precise measuring gap with reference to a magnetic sensor, and mechanical strength of the integral combination with the seal structure.

Another object of this invention is to provide a compact passive pulser ring provided radially between the inner peripheral surface of the outer ring and the outer peripheral surface of the inner ring of a bearing to axially detect magnetic resistances.

Another object of this invention is to provide a seal unit having a cylindrical support section for better parallelism, thereby precisely setting the axial gap between the sensor and the passive pulser ring.

Another object of this invention is to provide a seal ring comprising a cylindrical support section integrally formed with a flange support section for high strength.

Another object of this invention is to provide a seal ring comprising a flange support section by which a passive pusler ring is supported, thereby capable of using an improved support frame and passive pulser ring structure.

Another object of this invention is to provide a seal ring comprising an inexpensive frame whereby moldability, precision and strength are improved for better design, and a passive pulser ring having better pulse characteristics (thickness, shape, material property etc.).

BRIEF DESCRIPTION OF THE DRAWINGS

FIGS. 1, 1a and 1b are simplified diagram view of an active pulser ring system.

FIG. 2 is a simplified diagram view of an passive pulser ring system.

DESCRIPTION OF THE PREFERRED EMBODIMENTS

Figure 3:
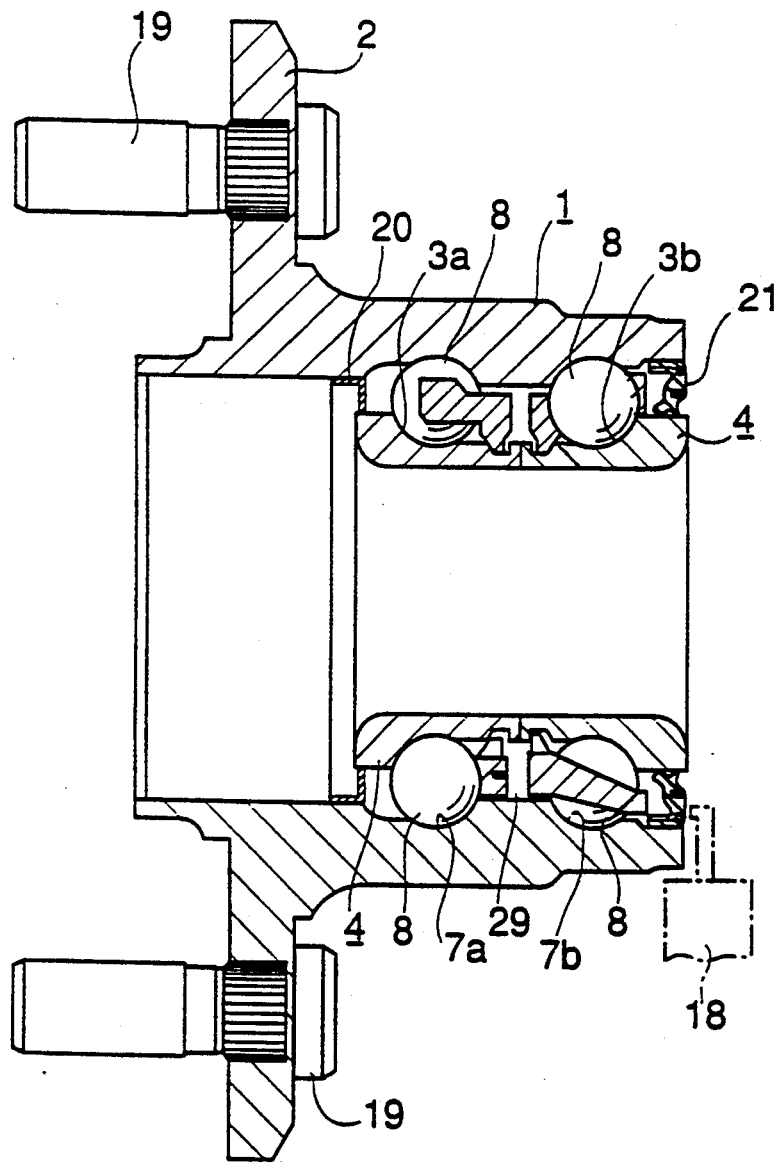
FIG. 3 is a cross-sectional view of an embodiment of the seal unit of the present invention with the seal ring installed in a bearing unit for detecting the rotating speed.
Figure 4:
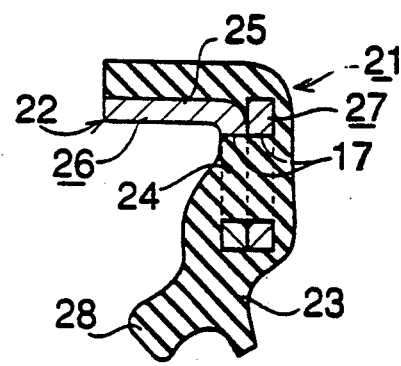
FIG. 4 is a cross-sectional view of the seal ring of FIG. 3.

FIGS. 3 and 4 show a first embodiment of this invention. Around the outside peripheral surface of the axially outer end (the left end in FIG. 3) of the hub 1 there is a flange 2 to which a wheel is fixed, and around the inside peripheral surface are outside tracks 7a, 7b for outer rings. Studs 19, used for fixing the wheel, are supported in the aforementioned flange 2.

Inside of the aforementioned hub 1 there is a pair of inner rings 4, around the outer surfaces of which inside tracks 3a, 3b for the inner rings are formed, and between these inside tracks 3a, 3b and the aforementioned outside tracks 7a, 7b are several rolling bodies 8 which allow the hub 1 to turn freely around the inner rings 4. The aforementioned pair of inner rings 4 are supported by wheel supporting king pins etc.

Furthermore, a first seal ring 20 is installed between the inside peripheral surface of the axially outer end of the aforementioned hub 1 and the outside peripheral surface of the axially outer end of the inner ring 4, and a second seal ring 21, which in this invention is used to detect the rotating speeds is installed between the inside peripheral surface of the axially inner end of the hub 1 and the outside peripheral surface of the axially inner end of the inner ring 4. These seal rings close off the space 29 which exists between the inside peripheral surface of the hub 1 and the outside peripheral surface of the inner rings 4, in which the several aforementioned rolling bodies 8 are located.

The seal unit or seal ring 21 for detecting rotating speeds, which is also referred to as "rpm detection seal ring", is shown in detail in FIG. 4, and comprises a reinforcing metal plate 22 which is annular or ring-shaped and made entirely of magnetic material, and a sealant material 23 made of elastic material such as rubber, polymer integral with the reinforcing plate 22. The reinforcing plate 22 has a ring-shaped flat section or flange support section 24 and a cylindrical support section 25 which is bent along the annular edge of the flat section 24, and there are several windows or cutouts 17 formed in the flat section 24 at intervals around the circumference. The terms "window" and "cutout" are used to include notches, openings, slots and/or throughholes.

The reinforcing plate 22 which makes up the seal unit or rpm detection seal ring 21 of this invention is constructed by placing together a main plate or frame 26 having the flange support section 24 and the cylindrical support section 25 in an L-shaped cross-section and a flat supplemental plate 27 which is referred to as passive pulser ring. In other words, the dimension of the thickness of the flat section 24 of the rpm detection seal ring 21 is made larger by putting together the main plate 26 formed in it and the supplemental plate 27.

The several windows or cutouts formed in both the flange support section 24 of the main plate 26 and the supplemental plate 27 are aligned together and then set inside the injection mold for the sealant material 23. As the sealant material 23 is injected, they are joined together by a portion of the elastic material which makes up the sealant material 23. In other words, the elastic material injected into the injection mold goes into the windows or cutouts 17 formed in both the flange support section 24 of the main plate 26 and the supplemental plate 27 before solidifying. Also, a portion of the aforementioned elastic material covers the outside peripheral surface of the cylindrical portion 25 formed by the main plate 26 and the remaining portion of elastic material protrudes from the inside rim of the main plate 26 and supplemental plate 27 and forms a york-shaped seal lip 28.

As described above, the rpm detection seal ring 21 of this invention, the cylindrical section 25 of which along its peripheral surface is covered by a portion of the elastic material, is friction fit around the inside peripheral surface of the axially inner end of the hub 1 to support and fix the hub 1. Also the inner rim of the seal lip 28 formed on the inside of the sealant material 23 comes in slidable contact with the outside peripheral surface of the axially inner end of the inner ring 4.

Also, an rpm detection sensor 18 faces the aforementioned windows or cutouts 17, and is supported by a non-rotating section such as the suspended apparatus.

As mentioned above, by putting the rpm detection seal ring 21 of this invention inside an anti-friction or rolling bearing unit, such as a ball bearing or roller bearing, it not only supports the wheel so that it turns freely with respect to the suspended apparatus, but can be used in nearly the same manner as the prior anti-friction or rolling bearing unit mentioned above in detecting the rpm of the wheel fixed to the flange 2 of the hub 1.

In other words, as the rpm detection seal ring 21 fixed inside the axially inner end of the hub 1 turns with the wheel, the output of the sensor 18 facing the windows or cutouts 17 in the seal ring 21 changes. The frequency that the output of this sensor 18 changes is proportional to the rotating speed. Therefore, if the output signal of the sensor 18 is input to a control device (not shown), so that the rotating speed of the wheel can be found and anti-lock Brake System (ABS) and Traction Control System (TCS) can be properly controlled. Also, the rpm detection seal ring 21 of this invention also prevents rain water and dirt from entering the space 29.

In the case of the rpm detection seal ring 21 of this invention, the reinforcing plate 22 is constructed by putting together the main plate 26 and the supplemental plate 27, thus increasing the thickness of the flat section 24 in which the aforementioned windows or cutouts are formed, so that the change in output of the sensor 18 which faces these windows or cutouts 17 is sufficiently increased, making it possible to more precisely detect the wheel rotating speed.

It is not necessary to increase the thickness of both the main plate 26 and supplemental plate 27, which are made of magnetic material and which make up the aforementioned flat section 24. Therefore the bending process of the main plate 26 can be performed using a low-cost manufacturing process such as a barring process.

Figure 5:
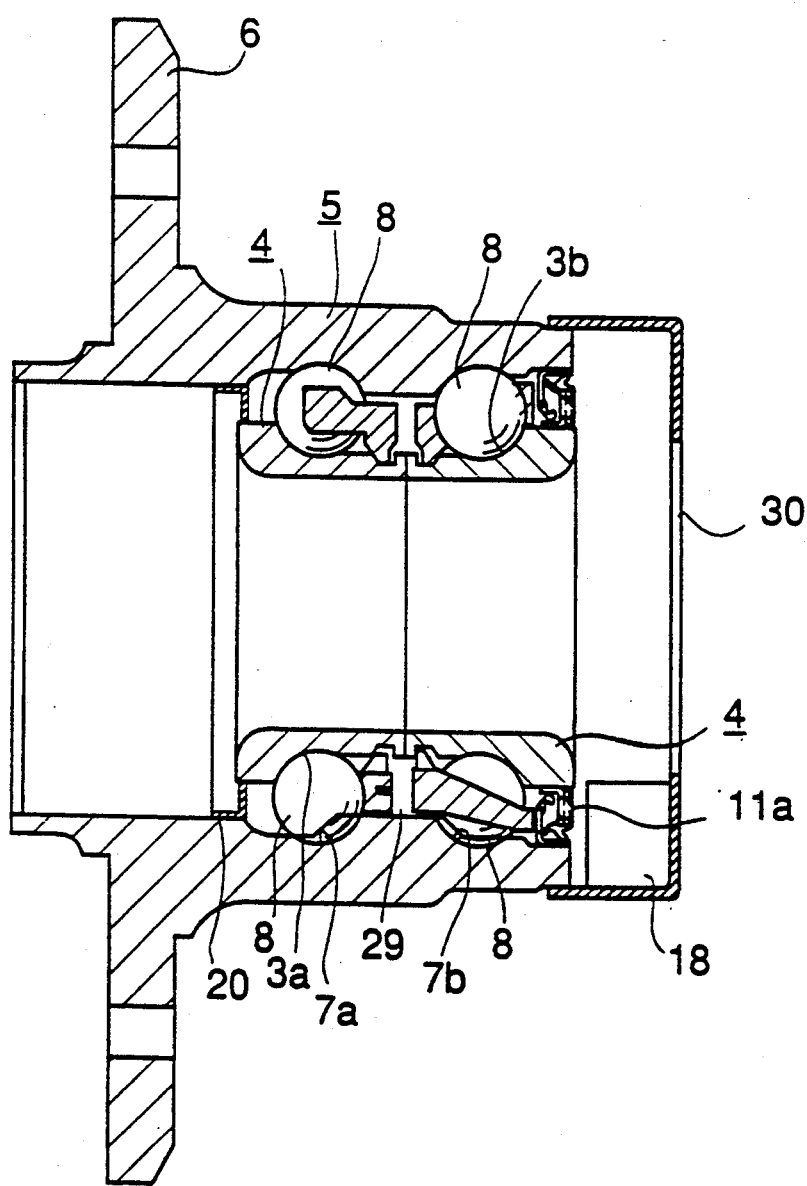
FIG. 5 is a cross-sectional view of another embodiment of the seal ring of the present invention with the seal ring installed in a bearing unit for detecting the rotating speed.
Figure 6:
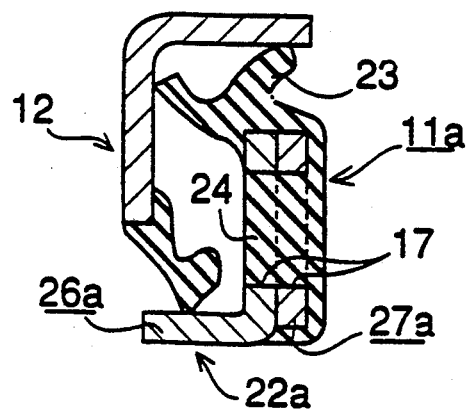
FIG. 6 is a cross-sectional view of the seal ring of FIG. 5.

Next, FIGS. 5 and 6 show a second embodiment of this invention. In this embodiment, an outer ring 5 is secured to the suspended apparatus (not shown) by the installation or mount section 6 formed around the outside peripheral surface of the outer ring 5, and the inner rings 4 turn freely with the wheel connected thereto. Also, the opening of the axially inner end of the space 29 where the rolling bodies are located is closed off by a seal unit or seal ring 11a, fixed around the outside peripheral surface of the axially inner end of the inner ring 4, and an outer seal ring 12, fitted into the inside peripheral surface of the axially inner end of the outer ring 5.

In this embodiment, the seal unit or seal ring 11a is the rpm detection seal ring. In other words, this seal ring 11a has a reinforcing plate 22a which comprises a main plate 26a and a supplemental plate or passive pulser ring 27a, and both of these plates 26a, 27a are put together, so that windows or cutouts 17 are formed in alignment.

Specifically, if the seal ring 11a for detecting the rotating speed of wheels comprises a single main plate or frame 26a made of an annular metal plate with a thickness of about 0.5 mm, it is subjected to barring process to form the main plate 26a in a L-shape in cross section.

However, if the main plate 26a had a thickness enough to obtain the larger output change of the sensor, it would be difficult to achieve sufficient precision in size through a simple barring process. Accordingly, the thick main plate 26a must be subjected to expensive deep drawing, resulting in a higher cost of seal ring production.

It should be noted that the thickness of the reinforcing plate 22a with the windows or cut-outs 17 can be made large because of the supplemental plate 27a enough to increase the output change of the sensor 18 to detect more precisely the rotating speeds of wheels and of the seal ring 11a.

Figure 8:
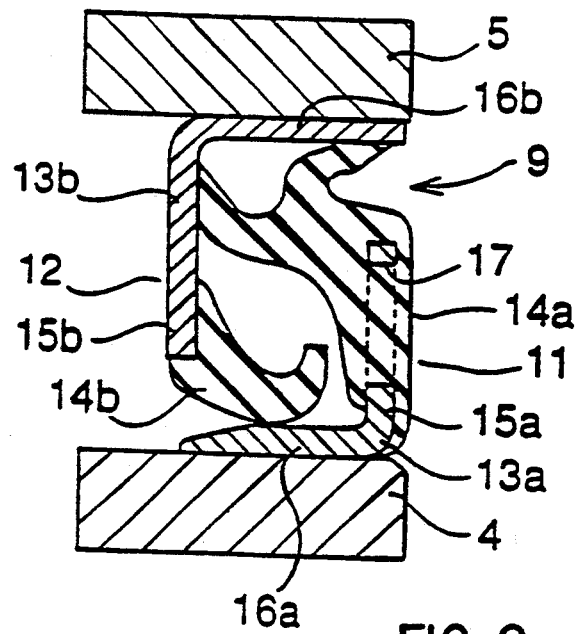
FIG. 8 is a cross sectional view of an example of the prior art seal ring.

On the other hand, without the supplemental plate 27a as shown in FIG. 8, when the main plate 15a must be simply made thick, the main plate 15a would be difficult to process, resulting in a higher production cost as mentioned above.

Fitted around the axially inner end of the aforementioned outer ring 5 is a metal plate which is bent in an L-shaped cross-section to form a generally ring-shaped cover 30, and the sensor 18 for detecting rotations is supported inside this cover 30.

The rest of the construction is substantially the same as the aforementioned first embodiment, therefore the like numbers are attached to like parts and any duplicate explanation will be omitted.

Figure 7A:
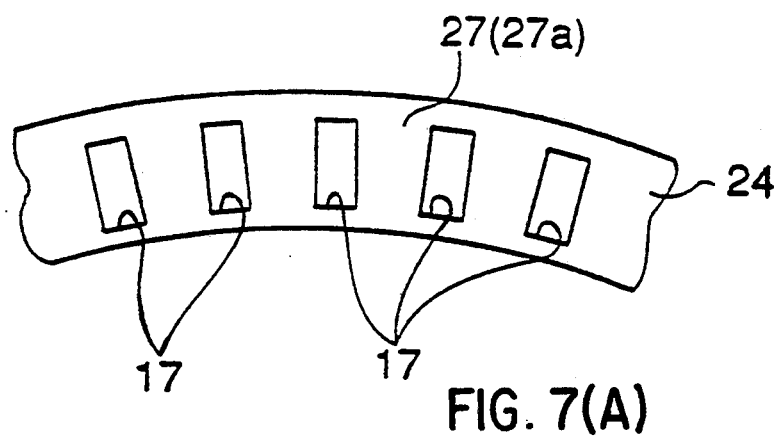
FIG. 7(A) and FIG. 7(B) are a front elevational view of the member with alternatively changing magnetic resistances.
Figure 7B:
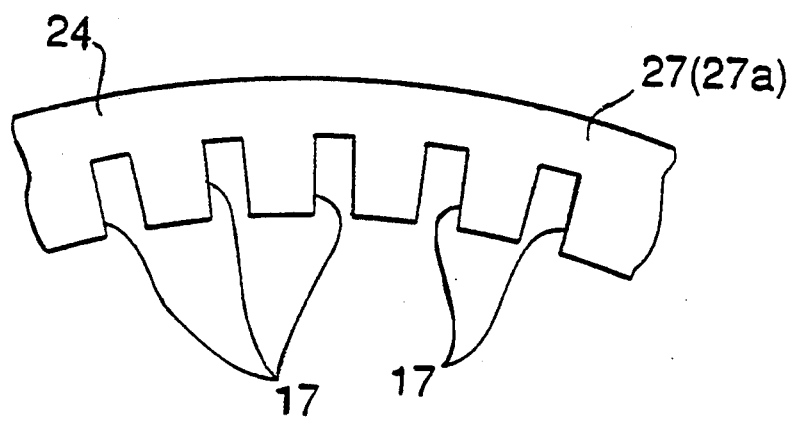

The shape of the sensor 18 for detecting the rpm of the seal ring 11a, as shown in FIGS. 5 and 6, can be as shown FIG. 3. Also, the windows or cutouts 17 formed in the main plates 26, 26a and supplemental plates 27, 27a can be through-holes as shown in FIG. 7(A), or they can be teeth-shaped notches as shown in FIG. 7(B). In any case, varying conditions due to uneven surface or through-holes are used for this purpose.

The rpm detection seal ring of this invention is constructed as described above, making it possible to more precisely detect the rotating speed of the wheel and there is no increase in manufacturing expense.

Figure 9:
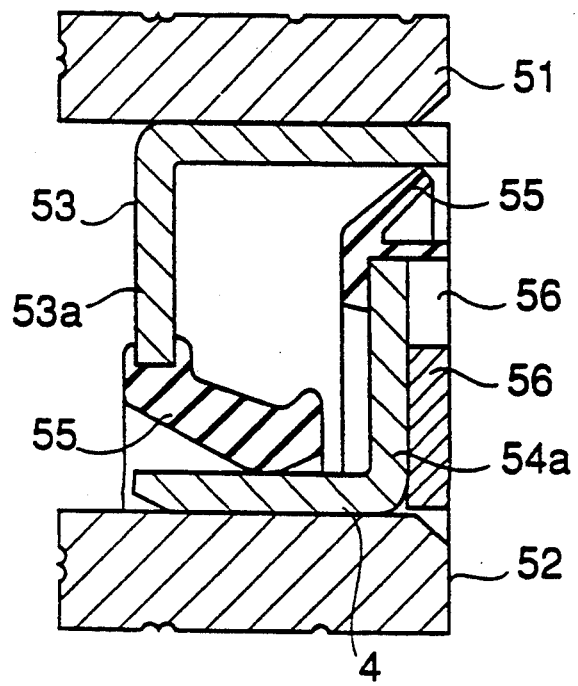
FIG. 9 is a cross-sectional view of another embodiment of the seal unit of the present invention.
Figure 10:
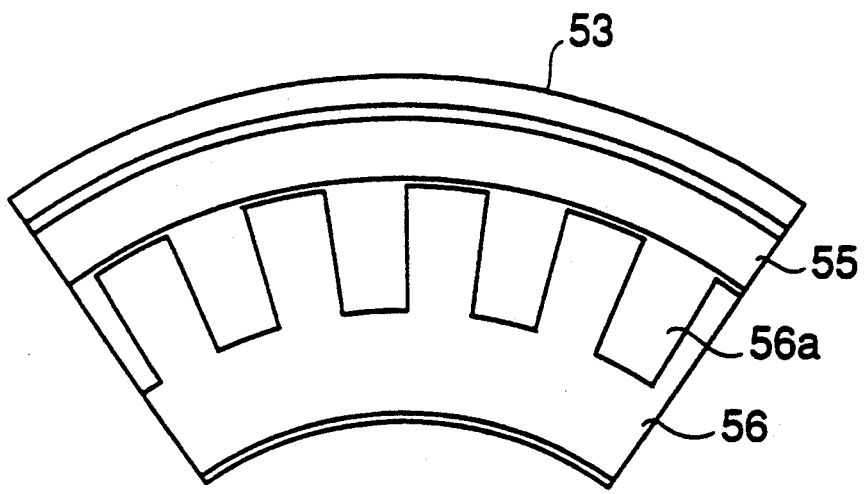
FIG. 10 is a front elevational view of a part of the seal unit of FIG. 9.

FIG. 9 and FIG. 10 show a third embodiment of the present invention.

In this embodiment of this invention, a supplemental plate 56 with cutouts 56a is installed integrally to the side face 54a of the seal element 54 between first and second relatively rotating members 51 and 52, making it easy to obtain more rigidity and making it possible to reduce the quality and thickness of each of the members, and to reduce the weight and cost.

This supplemental plate 56 is integrally formed with the seal element 54 as mentioned above, therefore when it is adjacent to the seal lip 55, it is easy to fill the notches 56a with the elastic material (this is possible even if it is not adjacent), and these notches 56a, filled with elastic material, are accurately separated, greatly improving the pulse generation function.

Also, if the substantially L-shaped seal elements 53 and 54 are made of a non-magnetic material and the supplemental plate 56 is made of magnetic material, thus making it possible to more accurately detect the revolution signal without being affected by the magnetic field from other parts.

In this embodiment, the bending of the seal elements can be achieved by an inexpensive barring process, and the seal elements and supplemental plate for the flat section need not be thick, respectively, even if the whole thickness of the those plates is made large to obtain a sufficient output change of the sensor.

In the construction of the seal apparatus (sometimes referred to as pack seal) of this type, the revolution detection function is located on the side open to the atmosphere, as shown in FIG. 9, and therefore it is possible to construct such a single structure where the plate 56 is located inside the seal apparatus, and by installing a rpm detection sensor (not shown in the figure) to the fixed outer ring seal element 53, as shown in FIG. 9, the detection of rotating speed is completely performed. Also, such a structure where the part of the plate 56 in which the notches 56a have been formed is bent in the axial direction, as shown in FIG. 10, so that the rpm detection sensor faces in the radial direction.

As described above, this invention integrates the means for detecting the rotating speed of the wheel directly into the seal apparatus, therefore, having many spatial and installation advantages, and makes it possible to do away with troublesome grinding and polishing of the installed parts. Also, it is simple to install the aforementioned seal apparatus in the prescribed locations as in conventional seals, and the installed seal apparatus serves as a guide to keep the aforementioned plate 56 in the proper position and keeps the installation angle in the radial direction highly precise.

Of course, the toothed rotor as used in the prior art is no longer required, and the precise grinding process on the press-fitting sections, otherwise required for obtaining precision in detection, is not necessary in this invention, so that this invention plays a large role in reducing the weight.

Also, the cut-outs 56a filled with elastic material are accurately separated, greatly improving the detection function as a rotor, while at the same time the anti-corrosive characteristics of the filled portions are improved. Anti-corrosive stainless magnetic supplemental plates can be used.

Figure 11:
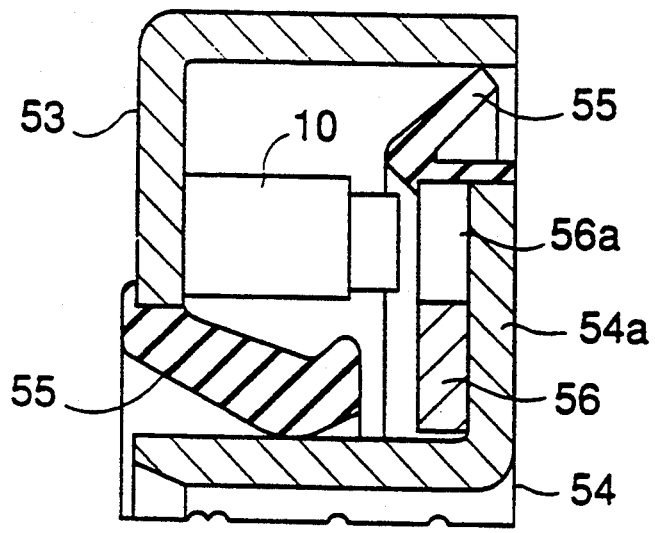
FIG. 11 is a cross-sectional view of another embodiment of the seal unit of the present invention.
Figure 12:
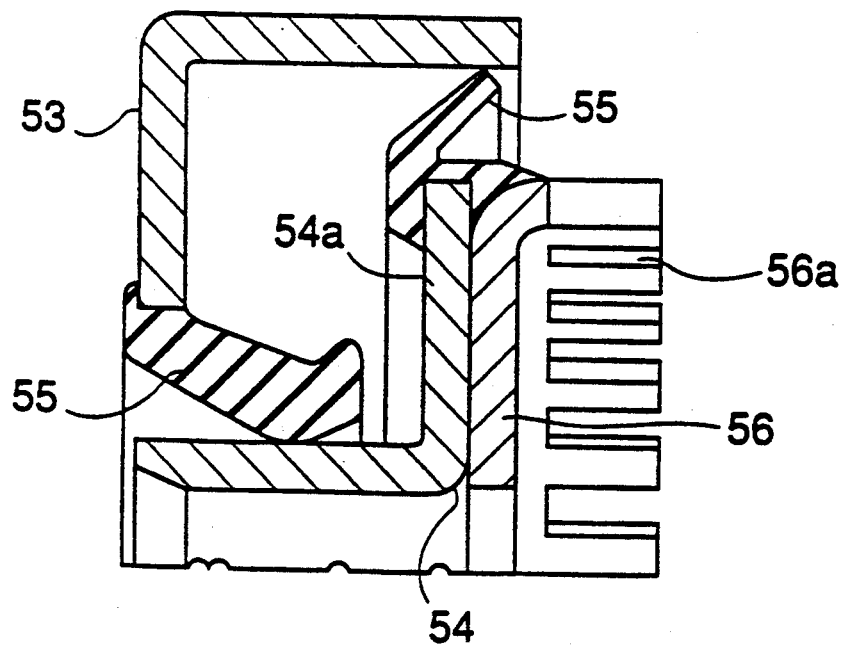
FIG. 12 is a cross-sectional view of another embodiment of the seal unit of the present invention.
Figure 13:
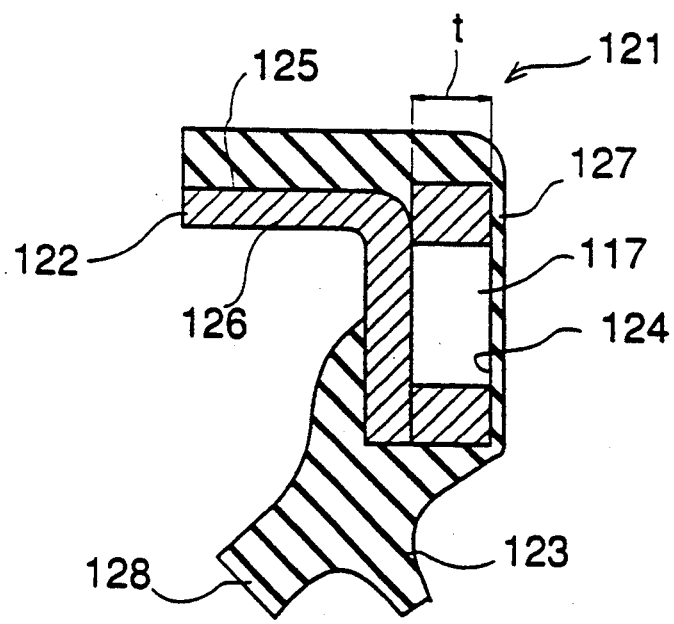
FIG. 13 is a cross-sectional view of another embodiment of the seal ring of the present invention.
Figure 14:
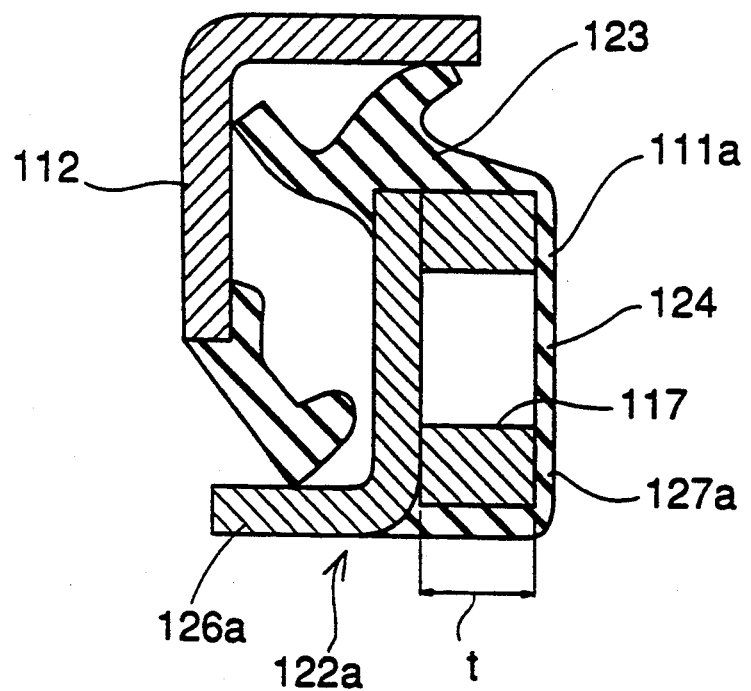
FIG. 14 is a cross-sectional view of another embodiment of the seal ring of the present invention.

Also, because it is possible to integrally form the plate 56 and seal elements 53 or 54 at the same time when the seal lip 55 is formed, formation characteristics are greatly improved. FIG. 11 and FIG. 12 show a modification of the third embodiment.

Figure 15:
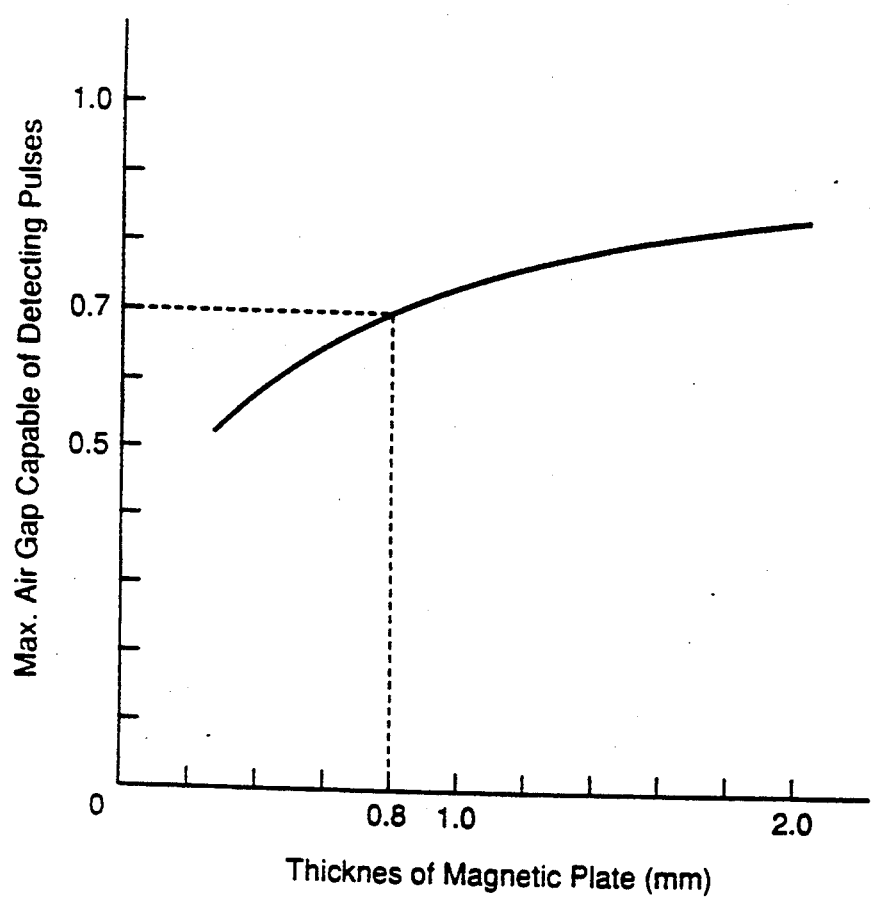
FIG. 15 is a graph showing a relationship between the maximum air gap capable of detecting pulses and the thickness of the magnetic plate of a seal ring of the present invention.

FIG. 13 through FIGS. 16(A),(B) show fourth embodiments of this invention in which the frame or main plates 126, 126a are made of magnetic material, and the thickness t of the magnetic supplemental plates or passive pulser rings 127, 127a is 0.8 mm or more so that the output from the sensor 18(see FIG. 3) is sufficient. In other words, when an active sensor is used as the sensor 18, the relationship between the thickness t of the magnetic supplemental plates 127, 127a and the maximum detectable air gap of the sensor 18 changes as shown in FIG. 15. When taking into consideration the cost of the sensor 118, the production cost and process precision of the seal ring 121, and the installation precision of the sensor 18 and seal ring 121, the maximum air gap normally allowed would be 0.7 mm, which corresponds to the thickness of the magnetic supplemental plates 127, 127a is 0.8 mm, making possible sufficient rpm detection. This is substantially the same even when the sensor 18 is a passive sensor, and the construction as described above is used, so that the output voltage is sufficiently large and sufficient rpm detection is possible.

Figure 16A:
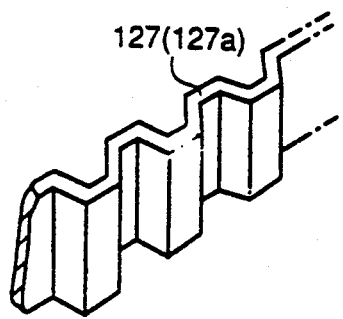
FIG. 16(A) and FIG. 16(B) are perspective view of part of the member having alternatively changing magnetic resistances.
Figure 16B:
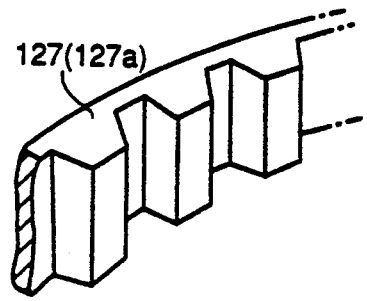

Also, instead of forming an uneven surface with indentations in the circumferential direction in the magnetic supplemental plates 127, 127a, through holes 117 can be made in the magnetic supplemental plates 127, 127a, or it is even possible to make the magnetic supplemental plates 127, 127a themselves uneven. In this case, each of the magnetic supplemental plates 127, 127a is subjected to a press process to form wave forms along its peripheral edge as shown in FIG. 16(A), or the magnetic supplemental plates 127, 127a can be formed using a coining process or sintering process as shown in FIG. 16(B) in order to make the aforementioned uneven surface with indentation. Here, the depth in the indentations of the uneven portions should be 0.8 mm or more.

Although an elastic seal 123 such as a rubber material covers the side faces of the magnetic plates 127, 127a in the embodiment as shown, the elastic seal 123 can be eliminated therefrom, so that the side faces of the magnetic supplemental plates 127, 127a are exposed. In this case, the distance between the side surface of the magnetic supplemental plates 127, 127a and the sensor 18(not shown) can be easily set. Specifically, the distance between the inside surface of the magnetic plates 127, 127a and the sensor 18(not shown) can be shortened for precise detection of the rotational speed.

Figure 17:
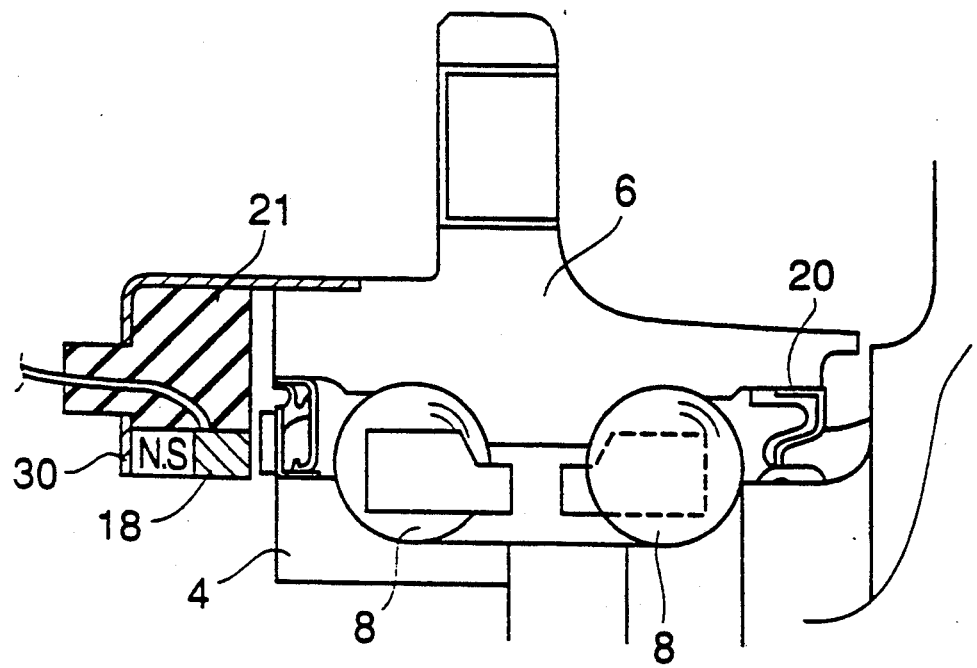
FIG. 17 is a cross-sectional view of another embodiment of the bearing unit of the present invention.
Figure 18:
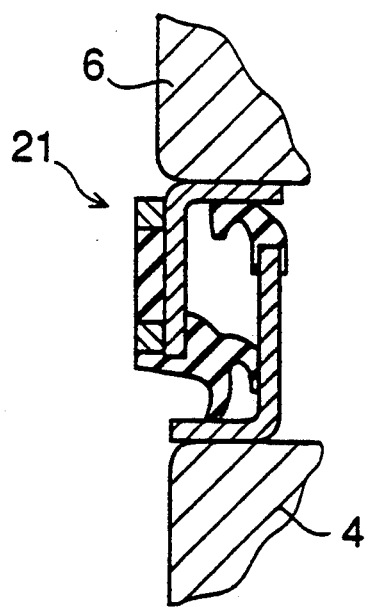
FIG. 18 is a cross-sectional view of the seal unit used in the bearing unit of FIG. 17.

FIG. 17 and FIG. 18 show a modification of the second embodiment of the present invention.

In this embodiment, the flange support section 24 of the frame 26a has no through-hole, and the supplemental plate or passive pulser ring 27a has a through-hole filled with the elastic material. The passive pulser ring 27a is positioned axially out of the side faces of the outer and inner rings. The rest of the construction is substantially same as the second embodiment, therefore the like numbers are attached to the like members and any duplicate explanation is omitted.

While there have been described herein what are considered to be preferred embodiments of the present invention, other modifications of the invention will be apparent to those skilled in the art from the teachings herein.

For example, although the main plate has the same diameter as the supplemental plate in the embodiment mentioned above, the supplemental plate can be freely changed in a radial direction corresponding to the mounting position of the sensor.

It is therefore desired to be secured in the appended claims all such modifications as fall within the true spirit and scope of the invention.

What is claimed is:

1. A pack seal apparatus comprising:
   a first rigid ring having a radial leg portion and an axial leg portion in an L-shaped cross section,
   a second rigid ring having a radial leg portion and an axial leg portion in an L-shaped cross section,
   the first and second rings coaxially arranged to be rotatable with respect to each other,
   a first elastic annular seal member secured to the radial leg portion of the first ring so as to be sealingly and slidingly engaged with the axial leg portion of the second ring,
   a second elastic annular seal member secured to the radial leg portion of the second ring so as to be sealingly and slidingly engaged with the axial leg portion of the first ring,
   the axial and radial leg portions of the first ring, the axial and radial leg portions of the second ring, and the first and second elastic annular seal members cooperating to define a closed annular space, and
   a pulser ring made of a separate thin metal plate mounted on the radial leg portion of one of the first and second rings, and having a peripheral portion formed with a plurality of cutouts therethrough, wherein the plurality of cutouts are arranged in a circumferential direction to be sensed as the pulser ring rotates with the one of the first and second rings.

2. The pack seal apparatus of claim 1, wherein the plurality of cutouts are filled with one of the first and second elastic annular seal members.

3. The pack seal apparatus of claim 1, wherein the pulser ring is provided within the closed space, and a sensor is mounted to the radial leg portion of the other of the first and second rings, so that the sensor is opposed to one of the cutouts.

4. The pack seal apparatus of claim 1, wherein the pulser ring is provided outside the closed space.

* * * * *